Nov. 16, 1965         D. OEHLERKING ETAL         3,218,597
                UNIVERSAL ELECTRICAL OUTLET BOX
Filed Feb. 4, 1963                          2 Sheets-Sheet 2
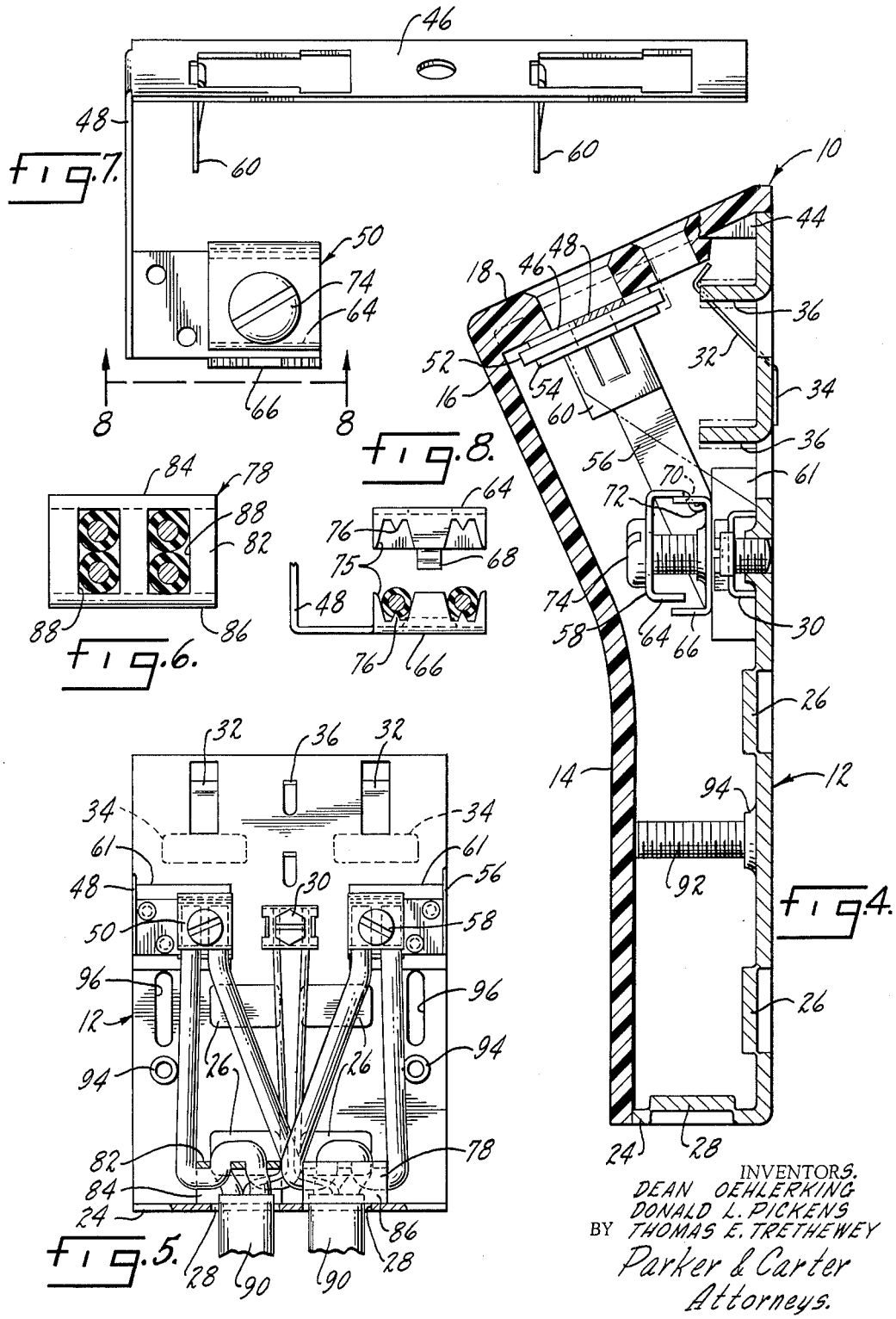

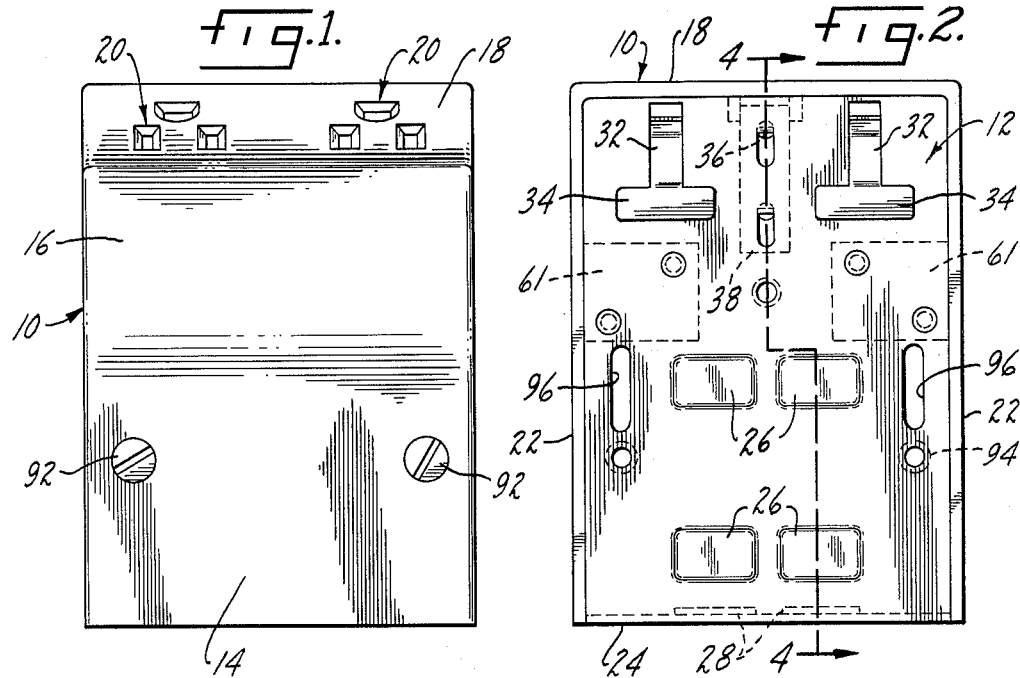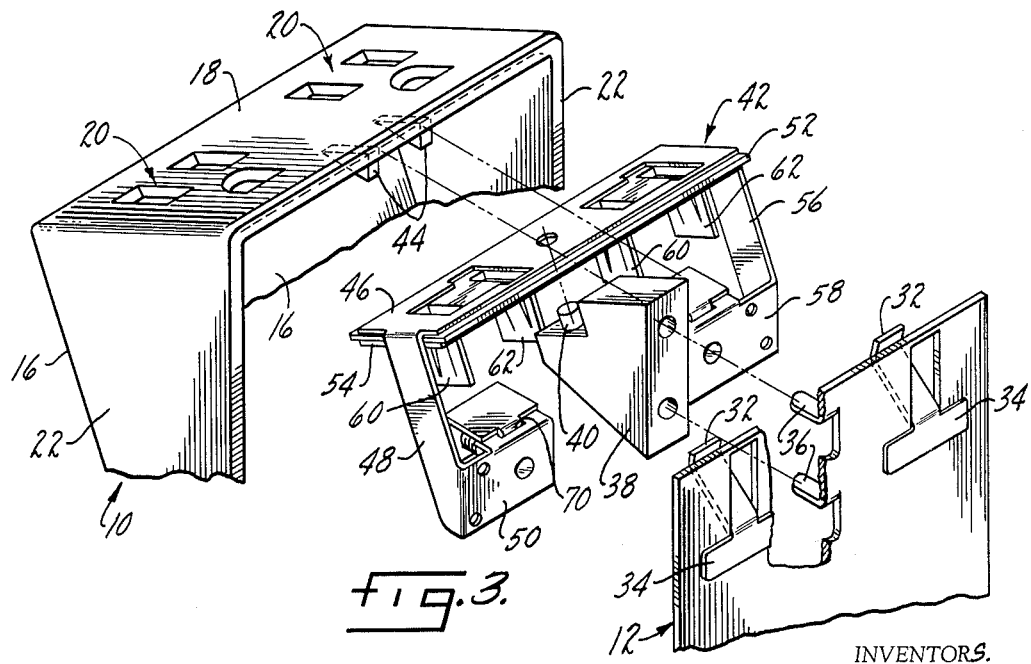

3,218,597
UNIVERSAL ELECTRICAL OUTLET BOX
Dean Oehlerking, Sycamore, Donald L. Pickens, De Kalb, and Thomas E. Trethewey, Sycamore, Ill., assignors to Ideal Industries, Inc., Sycamore, Ill., a corporation of Illinois
Filed Feb. 4, 1963, Ser. No. 255,765
12 Claims. (Cl. 339—14)

This invention relates to a universal electrical wiring device.

One purpose of the invention is a wiring device of the type described having knockout openings in the bottom and back walls.

Another purpose is a universal wiring device in which the back plate mounts the electrical terminals.

Another purpose is a wiring device of the type described adapted to be mounted on the outside of a wall surface.

Another purpose is a universal wiring device employing an improved electrical contact structure.

Another purpose is a wiring device including a strain relief.

Another purpose is a compact and easily unsable electrical wiring device.

Another purpose is an electrical wiring device of the type described in which the electrical terminals are yieldingly urged to an open position for ease in attaching the wires thereto.

Another purpose is a wiring device in which the wires do not have to be stripped prior to installation.

Other purposes will appear in the ensuing specification, drawings and claims.

The invention is illustrated diagrammatically in the following drawings wherein:

FIGURE 1 is a front plan view of the outlet box,
FIGURE 2 is a back view of the outlet box,
FIGURE 3 is a partial exploded perspective illustrating the electrical contact structure of the box,
FIGURE 4 is a section along plane 4—4 of FIGURE 2,
FIGURE 5 is a front view of the back plate, with the wires in place,
FIGURE 6 is a top plan view of a strain relief,
FIGURE 7 is an enlarged plan view of a portion of the electrical contact structure, and
FIGURE 8 is a view along plane 8—8 of FIGURE 7.

The outlet box includes a cover indicated generally at 10 and a back plate indicated generally at 12. As illustrated particularly in FIGURE 4, the cover has a front wall 14 which slants outwardly, as at 16, and joins with an upwardly and inwardly slanted top wall 18. The top wall 18 may have a plurality, in this case two, groups of openings 20 for receiving a conventional electric plug. As present-day wiring requirements specify a ground connection, there are three openings in each group. The cover 10 also includes rearwardly extending side walls 22, which together with the back plate 12 and its forwardly extending bottom wall 24, define an enclosure. The back plate is preferably formed of metal and is connected to ground. The cover, which will extend outwardly from a wall or the like may, for example, be formed of a molded plastic.

The back plate 12 may have a plurality of knockout openings 26 which may be removed in a conventional manner to form cable entrances. As shown in FIGURES 2 and 5 there are four such openings in the back plate 12. In addition, the forwardly extending bottom wall 24 may have a pair of knockout openings 28 which are generally in alignment with the openings 26 in the back plate. Cables may be drawn into the box either from below or from the back.

The back plate is preferably formed of an electrically conductive metal for use as a ground. There is a ground terminal 30 illustrated in FIGURE 5, attached to the back plate. A pair of spaced contacts 32 are positioned in openings in the back plate and then extend upwardly and forwardly toward the plug openings in top wall 18 for contact with the ground on an inserted plug. The contacts 32 may each have a laterally extending horizontal back portion 34 which lies outside or behind the back plate and may be soldered or otherwise suitably connected thereto. The contacts 32 may also be stamped out of the back plate or otherwise formed.

As illustrated in FIGURE 3, the back plate may have a pair of spaced forwardly extending pegs or the like 36, which together mount a block 38 which may be plastic or some other non-electrically conductive material. The block 38 has an upwardly and forwardly extending peg 40 which mounts the electrical contact structure indicated generally at 42. There is a pair of guides 44 mounted on the inside of top wall 18 for aligning the cover with the block 38.

The electrical contact structure 42 includes a front plate 46 formed of an electrically conductive metal and having an integral side strap 48 mounting a terminal 50. An insulating plate 52, which may be plastic or the like, may be positioned between the front plate 42 and a rear plate 54 also formed of an electrically conductive metal. The rear plate 54 has an integral strap 56 which mounts a second terminal 58. The front plate 46 has integral contacts 60 which extend rearwardly through openings in the insulating plate 52 and through similar openings in the rear plate 54. The rear plate 54 has integral contacts 62, similar to the contacts 60. The contacts 60 and 62 will be in contact with the ends of an electrical plug after it has been inserted. Small insulating blocks or the like 61 mount the terminals 50 and 58 to the back plate 12.

Each terminal includes a pair of contacts 64 and 66 with contact 66 being integral with the mounting strap. Contact 64 has a small tab 68 which extends through an opening 70 in contact 66. Tab 68 has a bent-over portion 72 which is urged against contact 66 in such a way as to bias contact 64 toward an open position. Screw 74 will close the contacts against the spring action of portion 72. Contacts 64 and 66 each have serrated edges or openings 75 formed with a pair of sharp points 76. The points 76 are adapted to pierce a wire positioned in the terminal or between the contacts and to contact the wire. It is not necessary to strip the insulation off the ends of the wires. FIGURE 8 illustrates the position of a wire when it is between the points 76.

There may be a pair of spaced strain reliefs 78 positioned within the box. The strain relief will be fastened to the wires and then pushed against the box wall adjacent the cable entrances. The number of strain reliefs used will be determined by the number of cables. Each of the strain reliefs is generally U-shaped and includes a top wall or base 82, a rear wall 84 and a front wall 86. The base or top wall 82 has a pair of openings 88 with each opening being of a size sufficient to hold two wires. As shown in FIGURE 5, cables 90 may come in through bottom openings 28. One wire from each cable will go to each of the terminals 50 and 58. Considering the left-hand cable 90, one wire will go through the front of one of openings 88, and then back around through the front of the second opening, and then up to terminal 50. The other wire will go through the two openings behind the first wire and then will go between the strain reliefs and to terminal 58. The strain reliefs may be formed of plastic or some other suitable material.

Screws or the like 92 pass through cover 10 into bosses or the like 94 to mount the cover to the back plate. There are elongated slots 96 formed in the back plate for use in adjustably mounting the back plate to a wall or the like.

The use, operation and function of the invention are as follows:

The outlet box may be mounted on a wall adjacent the floor and the cables may come into the box through the back or through the floor. The back plate of the box mounts all of the electrical contact structure and after the cables have been attached to the back plate, the plate is attached to the wall. The cover is then attached to the back plate. When the box is used with a wall structure which is raised off the floor to provide a cable trough, no holes have to be cut in the wall to mount the box. Even if the wall extends clear to the floor, the only holes necessary in the wall are for the cables. The box mounts completely on the surface of the wall, and when mounted adjacent the floor, may be placed between strips of molding.

By using elongated slots on the back plate for attaching the box to a wall, the height of the box may be adjusted even after the box has been mounted. In this way, if carpet is later added to a floor, the box may be raised up to set on top of the carpeting.

Of importance is the fact that all of the electrical contact structure is mounted to the back plate at the factory. The electrician need do nothing more than attach the wires and mount the back plate to a wall. The entire box is in two parts, a cover and a back plate.

The terminal is important. There are two contacts, each having points to pierce the wire within the insulation so that it is not necessary to remove the insulation. Also, the contacts are so formed and attached together that they are yieldingly urged to an open position. The electrician merely places the wires in the terminals and then screws the contacts together.

The electrical contact structure consisting of plates 46 and 54 separated by an insulating plate 52 is also important. The plates have openings for passage of the electrical contacts and each of the plates is integral with one of the terminals. The entire structure may be quickly assembled at the factory and fits compactly within the enclosure.

The strain reliefs are advantageous and do away with the conventional cable clamps which are normally attached to the outlet box at the cable entrance. By having the strain relief within the box and by having it utilize the wires from the cable, it is no longer necessary to attach the cable itself to the box.

The box of this invention is usable with plastic sheathed cable, such as Romex, although the box is also usable with the conventional metallic sheathed cable.

Whereas the preferred form of the invention has been shown and described herein, it should be realized that there are many modifications, substitutions and alterations thereto within the scope of the following claims.

We claim:

1. An electrical outlet box including a cover having at least one group of openings for insertion of an electrical plug, and a rear plate attached thereto adapted to be mounted to a wall or the like, said cover having rearwardly extending walls which together with the rear plate define an enclosure, at least one opening in the rear plate forming an electrical cable entrance, means mounted on the rear plate for attaching the cable wires to the box, means mounted on the rear plate for making electrical contact with an inserted plug including a pair of electrically conductive plates, a layer of conductive plates, a layer of insulation positioned therebetween, said pair of plates being attached to the inner plate of the box, with each of the plates in the pair having rearwardly extending integral contacts, and a strain relief for the cable within the box.

2. The structure of claim 1 further characterized in that said rear plate has a forwardly extending bottom wall, with said bottom wall and the rear plate having a plurality of knockout openings for forming cable entrances.

3. The structure of claim 1 further characterized in that said rear plate is formed of metal and has a forwardly extending contact which is adapted to be contacted by the ground contact of an inserted electrical plug.

4. The structure of claim 1 further characterized in that the rear of said pair of electrically conductive plates has openings through which the front plate contacts pass.

5. The structure of claim 1 further characterized in that the means for attaching the cable wires to the box are integral with the means for making electrical contact with an inserted plug.

6. The structure of claim 1 further characterized by a pair of terminals, one connecting to each wire of the cable, with each of said insulated plates being connected to one of said terminals.

7. The structure of claim 1 further characterized in that the means mounted on the rear plate for attaching cable wires to the box includes a pair of spaced releasable terminals, with each terminal having a pair of spaced members with opposed serrated edges adapted to pierce the wire insulation.

8. The structure of claim 7 further characterized in that each of said pair of terminals is yieldingly urged to an open position.

9. The structure of claim 8 further characterized in that each of said pair of terminals is yieldingly urged to an open position by a tab, connected to one member, and passing through a portion of the other member, said tab being pressed against said other member when the terminal is closed.

10. The structure of claim 1 further characterized in that said strain release includes a generally U-shaped member having openings therein for the cable wires.

11. The structure of claim 10 further characterized in that there are two openings for the cable wires, said openings being spaced apart and being of sufficient size for passing at least two wires.

12. The structure of claim 10 further characterized in that said wire openings are formed in the base of said U-shaped member.

References Cited by the Examiner

UNITED STATES PATENTS

| | | | |
|---|---|---|---|
| 2,283,544 | 5/1942 | Eaton | 339—105 |
| 2,323,736 | 7/1943 | Tousley | 339—31 |
| 2,618,677 | 11/1952 | Parish et al. | 339—192 |
| 2,666,908 | 1/1954 | Klostermann | 339—97 |
| 2,672,593 | 3/1955 | Shenton | 339—14 |
| 2,720,636 | 10/1955 | McKinley | 339—119 X |
| 3,083,349 | 3/1963 | Blonder | 339—98 |
| 3,118,714 | 1/1964 | Ludwig | 339—105 |

JOSEPH D. SEERS, *Primary Examiner.*

PATRICK A. CLIFFORD, *Examiner.*